United States Patent [19]

Bianco

[11] Patent Number: 5,434,402
[45] Date of Patent: Jul. 18, 1995

[54] APPARATUS FOR READING IDENTIFICATION STRIPS ON BOTH CARD SUBSTRATES AND CONTAINERS

[76] Inventor: James S. Bianco, 217 Brainard Rd., Enfield, Conn. 06082

[21] Appl. No.: 213,847

[22] Filed: Mar. 15, 1994

[51] Int. Cl.$^6$ .............................................. G06K 7/10
[52] U.S. Cl. .................................................. 235/472
[58] Field of Search ............... 235/472, 462, 439, 440, 235/483, 484, 485, 449, 482, 486, 487; 382/59

[56] References Cited

U.S. PATENT DOCUMENTS

| | | | |
|---|---|---|---|
| 4,457,016 | 6/1984 | Pfeffer | 235/484 X |
| 5,065,001 | 11/1991 | Hennick et al. | 235/484 X |
| 5,260,552 | 11/1993 | Colbert et al. | 235/472 X |
| 5,266,789 | 11/1993 | Anglin et al. | 235/449 X |
| 5,345,090 | 9/1994 | Hludzinski | 235/482 X |

FOREIGN PATENT DOCUMENTS

| | | | |
|---|---|---|---|
| 4128520 | 3/1993 | Germany | 235/462 |
| 5314295 | 11/1993 | Japan | 235/483 |

Primary Examiner—Donald Hajec
Assistant Examiner—Michael G. Lee
Attorney, Agent, or Firm—John H. Crozier

[57] ABSTRACT

In a preferred embodiment, an apparatus for reading identification strips on both planar card substrates and containers, the identification strips being disposed on the substrates and the containers parallel to, and spaced a given distance from, edges on the substrates and containers, comprising: a hand carryable, portable housing containing therein apparatus for reading an identification strip through an aperture defined through a first planar surface thereof; conversion apparatus to selectively place the apparatus in one of first and second configurations; in the first configuration, a the identification strip on a the container can be read by the apparatus by moving the aperture along the identification strip, with the first surface in contact with the surface of the container on which the identification strip is disposed, and with a portion of the housing engaging a the edge on the container so as to maintain the aperture the given distance from the edge; and in the second configuration, an identification strip on a substrate can be read by the apparatus by sliding the substrate through a narrow slot defined between the first surface and a second planar surface parallel to the first surface, with a portion of the housing engaging the edge of the substrate so as to maintain the aperture the given distance from the edge.

4 Claims, 3 Drawing Sheets

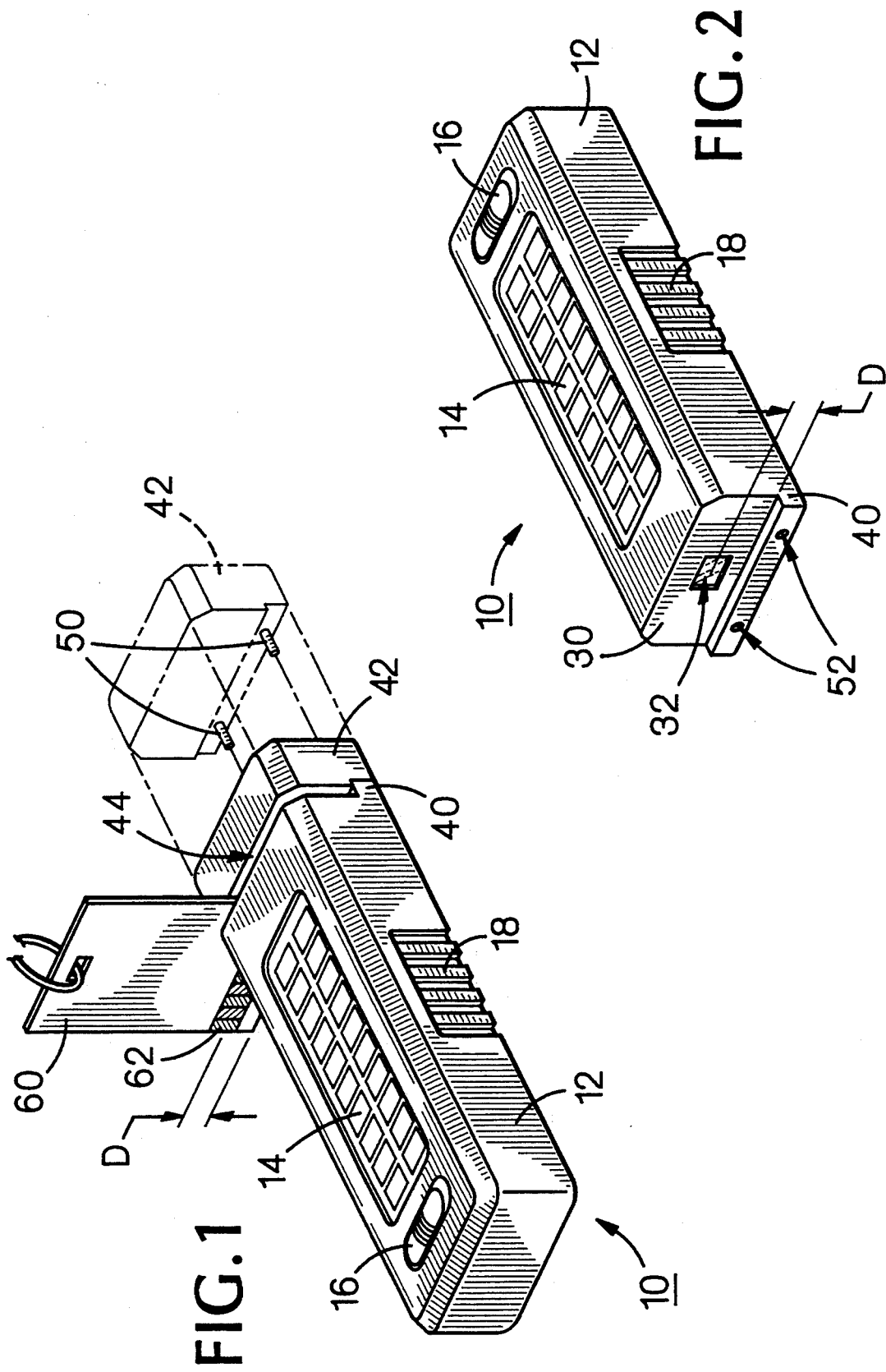

APPARATUS FOR READING IDENTIFICATION STRIPS ON BOTH CARD SUBSTRATES AND CONTAINERS

BACKGROUND OF THE INVENTION

1. Field of the Invention

The present invention relates to authentication systems generally and, more particularly, but not by way of limitation, to a novel identification strip reader that can be employed to read such strips on both cards and containers.

2. Background Art

Bar codes are used universally for identification and information purposes. A widely known such use is with point-of-sale bar code readers which are used primarily to identify an article and its sales price. Recently, compound diffraction gratings have been developed for identification and information purposes, since the use of such gratings greatly reduces the possibility of forgery or unauthorized copying. Examples of such gratings are described in U.S. patent application Ser. No. 08/115,412, filed Aug. 31, 1993, by David J. Horan and James S. Bianco, and titled SECURE OPTICAL IDENTIFICATION METHOD AND MEANS, the disclosure of which application is incorporated by reference hereinto.

One setting in which such identification means may be employed is in the authentication of goods as diverse as name brand watches, garments, and packaged computer programs, for example. These are goods that are frequently counterfeit and the counterfeiting is of such quality that detection of the same by visual inspection is difficult even by knowledgeable persons.

To combat such counterfeiting, a watch or a garment may have a tag attached thereto having a relatively narrow identification strip thereon, the strip including a diffraction grating and/or bar code encoded with authentication information. Decoding of the information determines whether or not the item is genuine. Similarly, the carton containing the computer program disks and instructions may have a relatively narrow identification strip attached thereto underneath the cellophane typically encasing the carton.

Because of the narrowness of the identification strips, reading thereof with a typical hand-held scanner is difficult, since imprecise alignment of the beam with the strips can result in inaccurate decoding.

A need exists for apparatus to conveniently and accurately read such identification strips on both tags and cartons.

Accordingly, it is a principal object of the present invention to provide apparatus for reading identification strips on both card substrates and cartons.

It is an additional object of the invention to provide such an apparatus that is conveniently used.

It is a further object of the invention to provide such an apparatus that is economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus for reading identification strips on both planar card substrates and containers, said identification strips being disposed on said substrates and said containers parallel to, and spaced a given distance from, edges on said substrates and containers, comprising: a hand carryable, portable housing containing therein means for reading an identification strip through an aperture defined through a first planar surface thereof; conversion means to selectively place said apparatus in one of first and second configurations; in said first configuration, a said identification strip on a said container can be read by said apparatus by moving said aperture along said identification strip, with said first surface in contact with the surface of said container on which said identification strip is disposed, and with a portion of said housing engaging a said edge on said container so as to maintain said aperture said given distance from said edge; and in said second configuration, a said identification strip on a said substrate can be read by said apparatus by sliding a said substrate through a narrow slot defined between said first surface and a second planar surface parallel to said first surface, with a portion of said housing engaging a said edge of said substrate so as to maintain said aperture said given distance from said edge.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 1 is an isometric view of an apparatus, according to the present invention, shown with a conversion block attached thereto and reading an identification strip on a card substrate.

FIG. 2 is an isometric view of the apparatus with the conversion block removed.

DETAILED DESCRIPTION OF THE PREFERRED EMBODIMENTS

Figure 3:
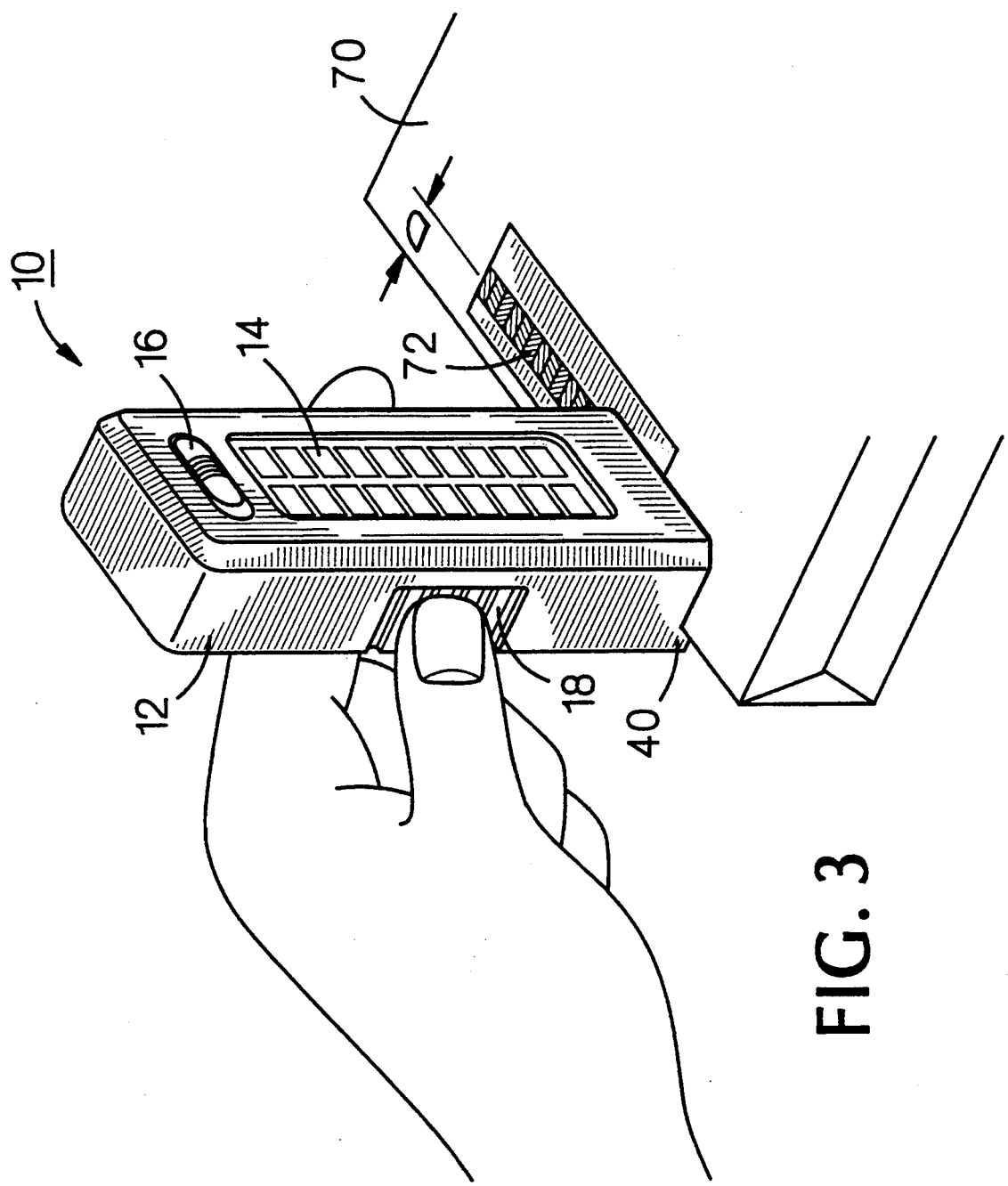
FIG. 3 is an isometric view of the apparatus with the conversion block removed shown reading an identification strip on a container.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates an apparatus for reading identification strips on both card substrates and containers, constructed according to the present invention, and generally indicated by the reference numeral 10. Apparatus 10 includes a main housing 12 in which is disposed equipment and circuitry (not shown) for reading identification strips, as more fully described in the above-referenced patent application. A display 14 and a control switch are provided to assist in operation of apparatus 10. Grip surfaces 18 are provided on either side of main housing 12 for the convenient manual grasping thereof.

Referring also to FIG. 2, main housing 12 includes a an end wall 30 having defined therethrough a windowed aperture 32 through which the internal components may read an identification strip. A flange 40 extends orthogonally outwardly from end wall 30 and the upper surface of the flange is spaced a distance "D" from the optical center of the photodetecting apparatus (not shown) in main housing 12.

Turning back to FIG. 1, main housing 12 is shown as having attached thereto a conversion block 42 mounted to flange 40 so as to define between end wall 30 (FIG. 2) and the inner surface of the conversion block a narrow slot 44, which slot includes the upper surface of the flange as the floor of the slot. Conversion block 42 is removably mounted to flange 40 by means of two pins 50 frictionally held in two corresponding holes (FIG. 2) defined in the end of the flange.

On FIG. 1, a card 60, which may be assumed to be attached to a watch or a garment, for example, is shown as being inserted through slot 44. Card 60 has disposed thereon an identification strip 62 which may be the type of identification strip described in the above-referenced patent application. Strip 62 is disposed on card 60 such that the strip is parallel to the lower edge of the card and the center of the strip is spaced apart from that edge by the distance "D", the same distance "D" as indicated on FIG. 2. It will be understood, then, that when card 60 is swiped through slot 44, the engagement of the lower edge of the card with flange 40 will maintain the center of identification strip 62 in the center of the photodetecting apparatus in main housing 12.

Figure 4:
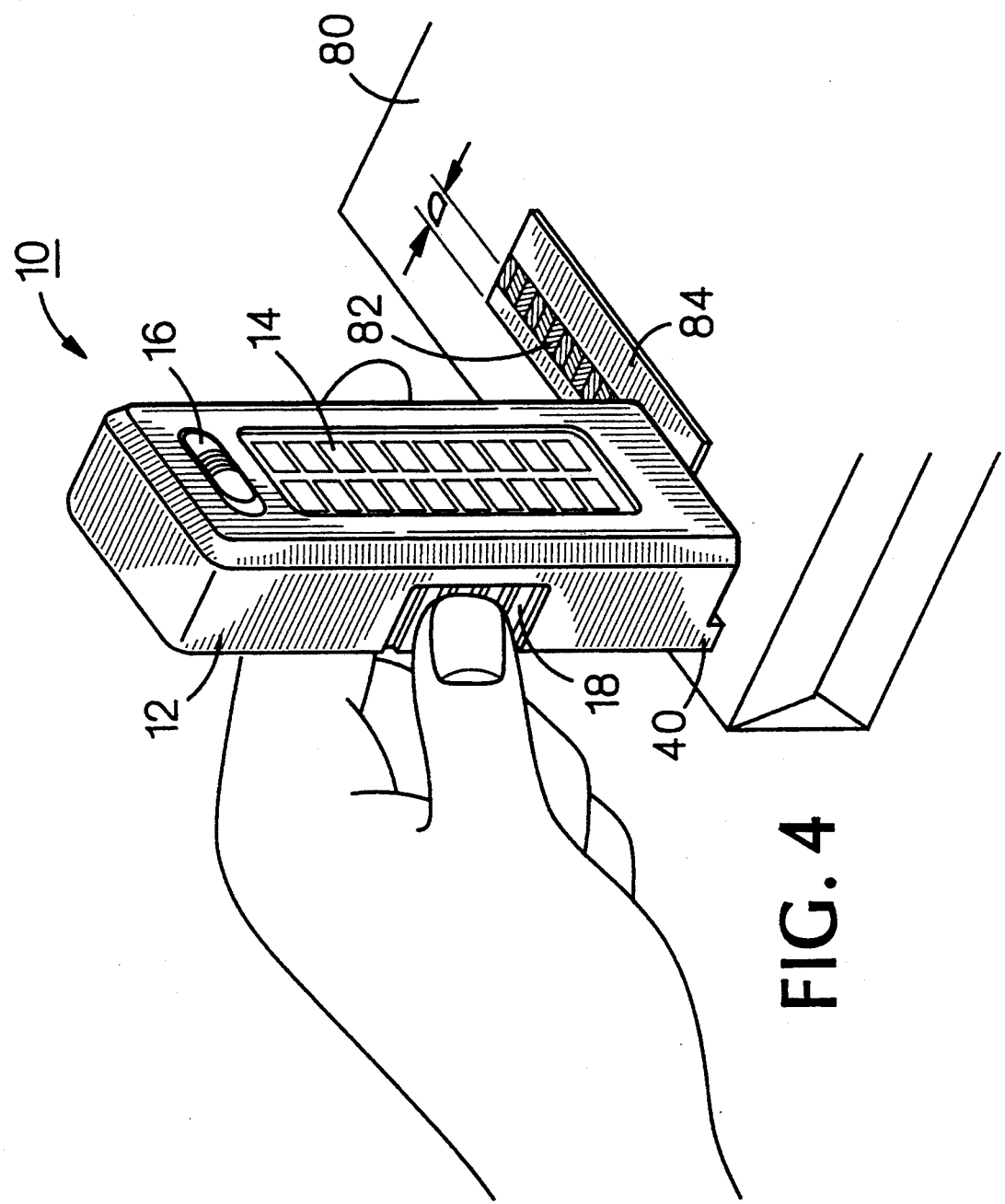
FIG. 4 is an isometric view of the apparatus with the conversion block removed shown reading another identification strip on a container.

FIGS. 3 and 4 illustrate apparatus 10 with conversion block 42 (FIG. 1) removed therefrom and being employed to read identification strips on cartons.

FIG. 3 illustrates a container 70 on which is disposed an identification strip 72, the strip having been located parallel to an edge of the container and spaced apart therefrom the distance "D". Now, when apparatus 10 is slid along container 70, with the end wall 30 (FIG. 2) engaging the upper surface of the container and the upper surface of flange 40 engaging the edge of the container, the center of identification strip 72 will be maintained at the optical center of the photodetecting apparatus in main housing 12. Identification strip 72 can be read directly through the cellophane wrapping typically sealed around containers for computer programs.

FIG. 4 illustrates a container 80 on which there is disposed an identification strip 82. Rather than having strip 82 disposed in relation to the edge of the container, strip 82 is disposed on a relative thick substrate 84 which is attached to the container, the strip being parallel to an edge of the substrate and spaced apart therefrom the distance "D". Thus, the edge of substrate 84 is used as a guide for flange 40, rather than an edge of container 80. This arrangement has the advantage that exact placement of substrate 84 on container 80 is not required.

Apparatus 10 is battery operated, small, and highly portable. With a single instrument, an operator thereof can easily check authenticity of a variety of goods having identification strips attached to tags or identification strips attached directly to the containers for the goods.

Apparatus 10 may be economically manufactured of molded polymeric parts and the internal parts of the apparatus may be conventional photodetecting equipment and circuitry.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An apparatus for reading identification strips on both planar card substrates and containers, said identification strips being disposed on said substrates and said containers parallel to, and spaced a given distance from, edges on said substrates and containers, comprising:
    (a) a hand carryable, portable housing containing therein means for reading an identification strip through an aperture defined through a first planar surface thereof;
    (b) conversion means to selectively place said apparatus in one of first and second configurations;
    (c) in said first configuration, an identification strip on a said container can be read by said apparatus by moving said aperture along said identification strip, with said first surface in contact with the surface of said container on which said identification strip is disposed, and with a portion of said housing engaging a said edge on said container so as to maintain said aperture said given distance from said edge; and
    (c) in said second configuration, an identification strip on a said substrate can be read by said apparatus by sliding a said substrate through a narrow slot defined between said first surface and a second planar surface parallel to said first surface, with a portion of said housing engaging a said edge of said substrate so as to maintain said aperture said given distance from said edge.

2. An apparatus, as defined in claim 1, wherein:
    (a) said portion of said housing includes a planar flange extending orthogonally outwardly from said first surface and spaced apart from said aperture said given distance; and
    (b) said conversion means comprises a block having said second surface forming a wall thereof, said block being removably attachable to said flange, so as to place said apparatus in said first configuration when said block is removed from said flange and to place said apparatus in said second configuration when said block is attached to said flange.

3. An apparatus, as defined in claim 1, wherein said edge on said container is an edge of a carton forming said container.

4. An apparatus, as defined in claim 1, wherein said edge on said container is an edge of a substrate attached to said container and on which substrate said identification strip is disposed.

\* \* \* \* \*